(12) United States Patent
Grice

(10) Patent No.: US 7,540,233 B1
(45) Date of Patent: Jun. 2, 2009

(54) MULTI-USE COOKER

(76) Inventor: Eddie D. Grice, 427 King St., Gary, IN (US) 46406

( * ) Notice: Subject to any disclaimer, the term of this patent is extended or adjusted under 35 U.S.C. 154(b) by 566 days.

(21) Appl. No.: 11/260,958

(22) Filed: Oct. 27, 2005

(51) Int. Cl.
*A47J 37/07* (2006.01)
*A21B 3/13* (2006.01)
(52) U.S. Cl. .......................................... 99/340; 99/324
(58) Field of Classification Search .................... 99/340, 99/339, 324, 376, 452.13
See application file for complete search history.

(56) References Cited

U.S. PATENT DOCUMENTS

| | | | | |
|---|---|---|---|---|
| 5,752,433 | A | * | 5/1998 | Charlson et al. ............... 99/445 |
| 6,037,571 | A | * | 3/2000 | Christopher ............. 219/450.1 |
| 2002/0189462 | A1 | * | 12/2002 | Guess .......................... 99/326 |
| 2006/0000365 | A1 | * | 1/2006 | Attie ........................... 99/340 |

* cited by examiner

*Primary Examiner*—Daniel L Robinson

(57) ABSTRACT

A multi-use cooker is disclosed. The multi-use cooker includes a cooking chamber having a cooking chamber interior. A charcoal/wood grilling section and a gas grilling section are provided in the cooking chamber interior. A burner coil and a rotisserie rack are provided in the gas grilling section.

12 Claims, 5 Drawing Sheets

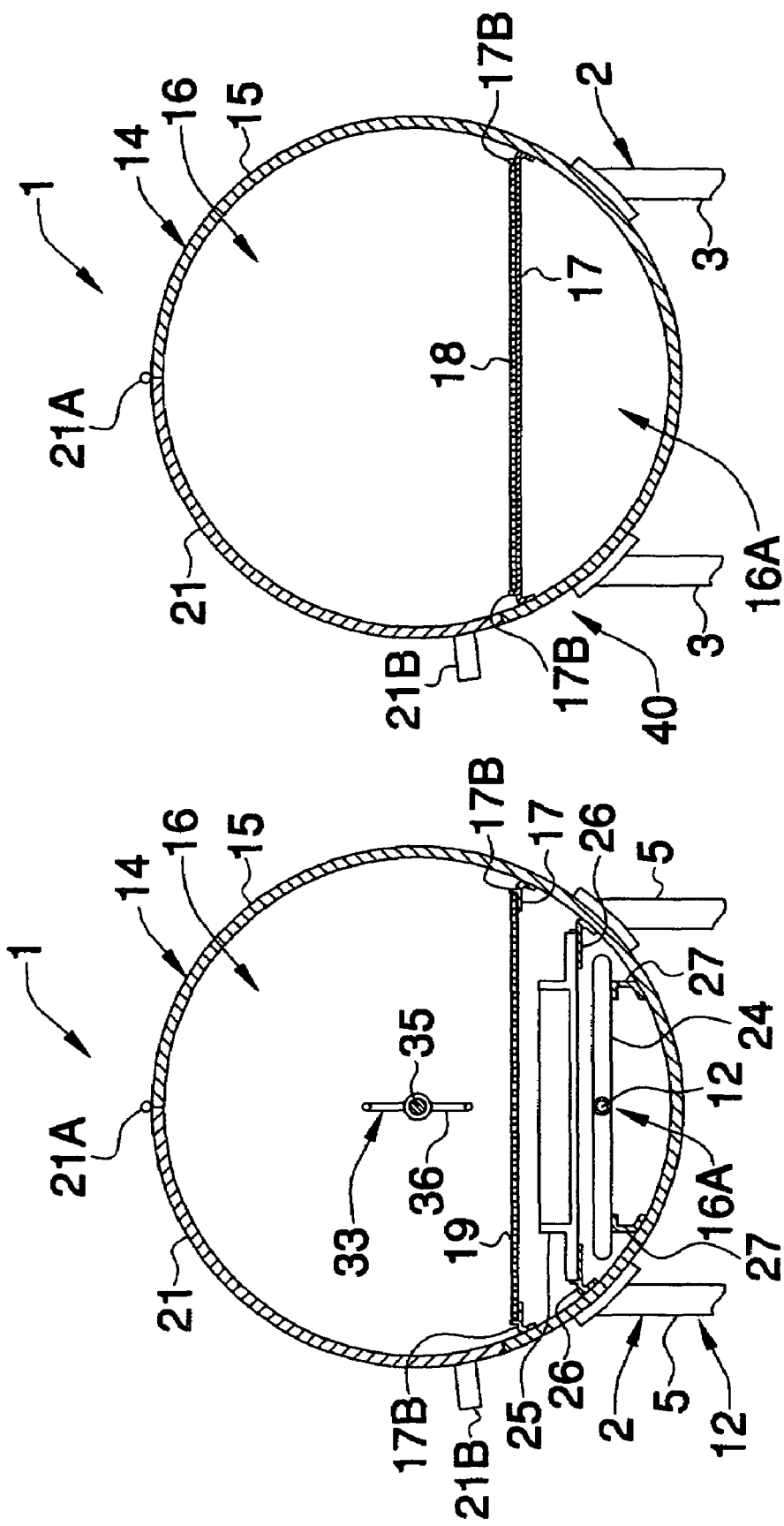

US 7,540,233 B1

MULTI-USE COOKER

FIELD OF THE INVENTION

The present invention relates to cookers. More particularly, the present invention relates to a multi-use cooker which may be used as a gas grill, a charcoal grill, a smoker and/or a rotisserie cooker.

BACKGROUND OF THE INVENTION

Outdoor cooking is a favorite pastime for many persons. Typically, an outdoor cooker is designed to grill, smoke, roast or barbecue various types of meats or vegetables. However, most outdoor cookers are suitable for cooking foods according to only one cooking method.

SUMMARY OF THE INVENTION

The present invention is generally directed to a multi-use cooker. The multi-use cooker includes a cooking chamber having a cooking chamber interior. A charcoal/wood grilling section and a gas grilling section are provided in the cooking chamber interior. A burner coil and a rotisserie rack are provided in the gas grilling section.

BRIEF DESCRIPTION OF THE DRAWINGS

The invention will now be described, by way of example, with reference to the accompanying drawings, in which:

FIG. 5 is a sectional view, taken along section lines 5-5 in FIG. 1, of the cooking chamber element of the multi-use cooker; and FIG. 6 is a sectional view, taken along section lines 6-6 in FIG. 1, of the cooking chamber element of the multi-use cooker.

DETAILED DESCRIPTION OF THE INVENTION

Figure 1:
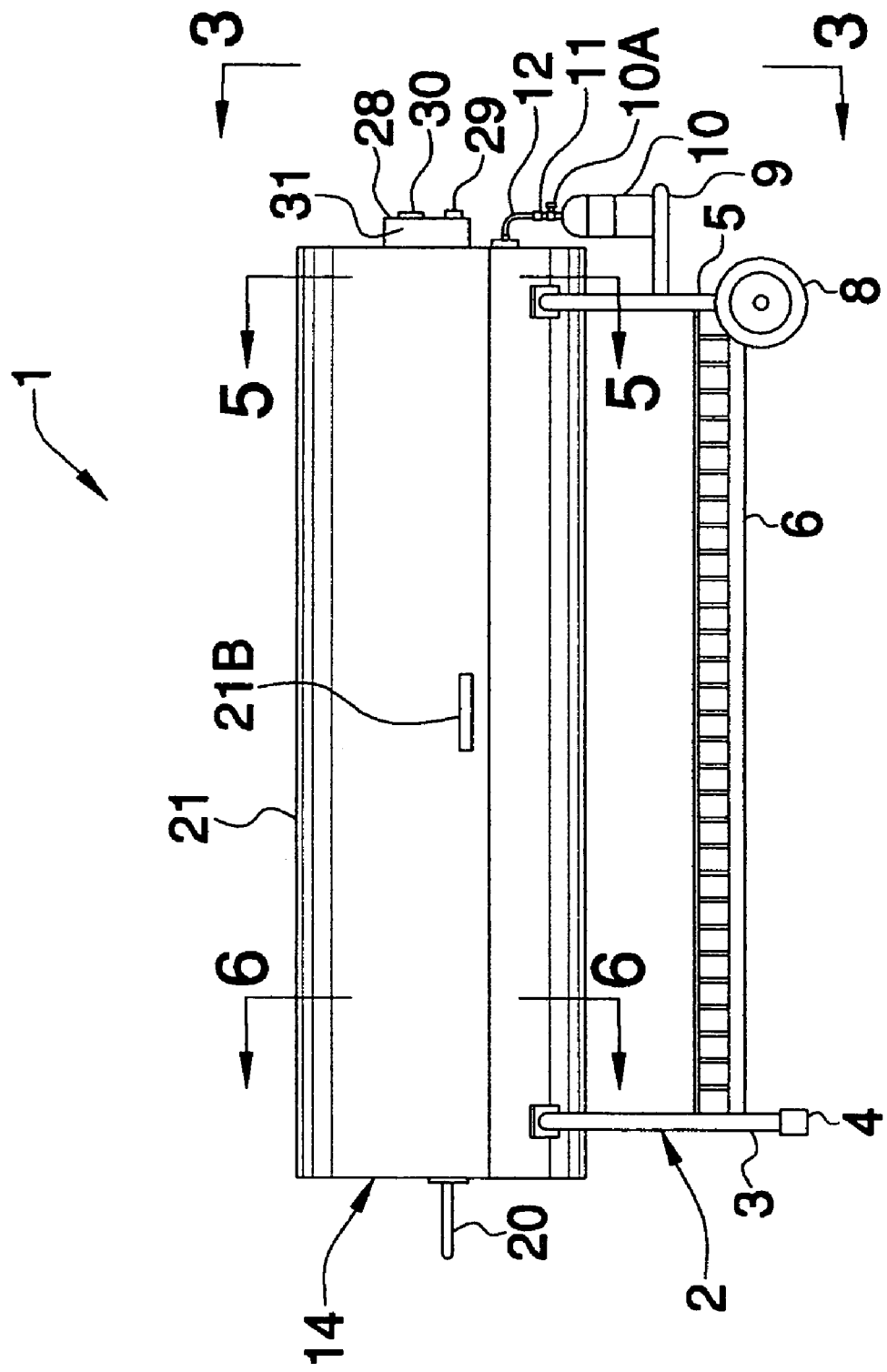
FIG. 1 is a side view of an illustrative embodiment of the multi-use cooker according to the present invention.
Figure 2:
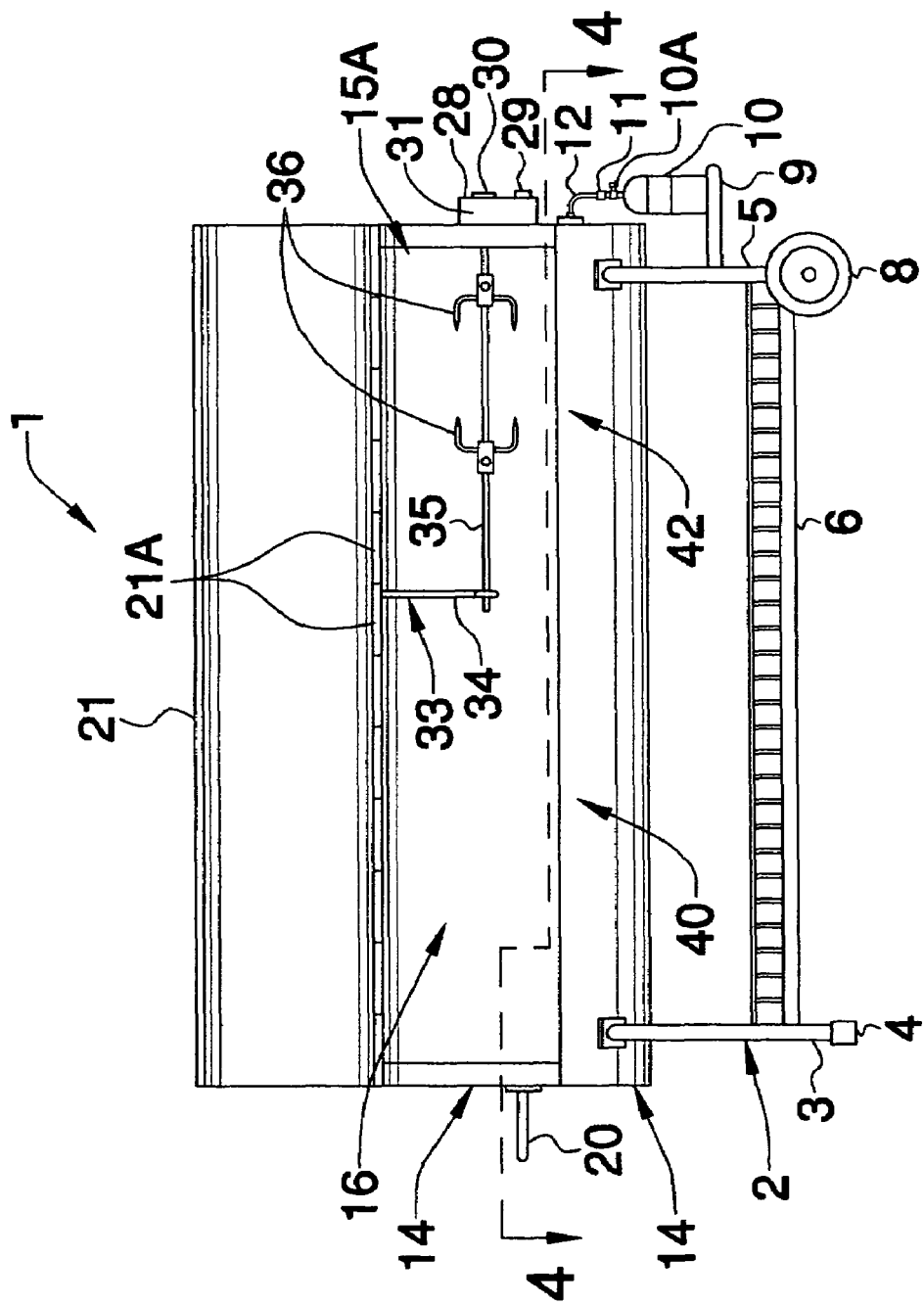
FIG. 2 is a side view of the multi-use cooker, with the lid element of the multi-use cooker opened and illustrating a rotisserie rack in the interior of the cooking chamber.
Figure 3:
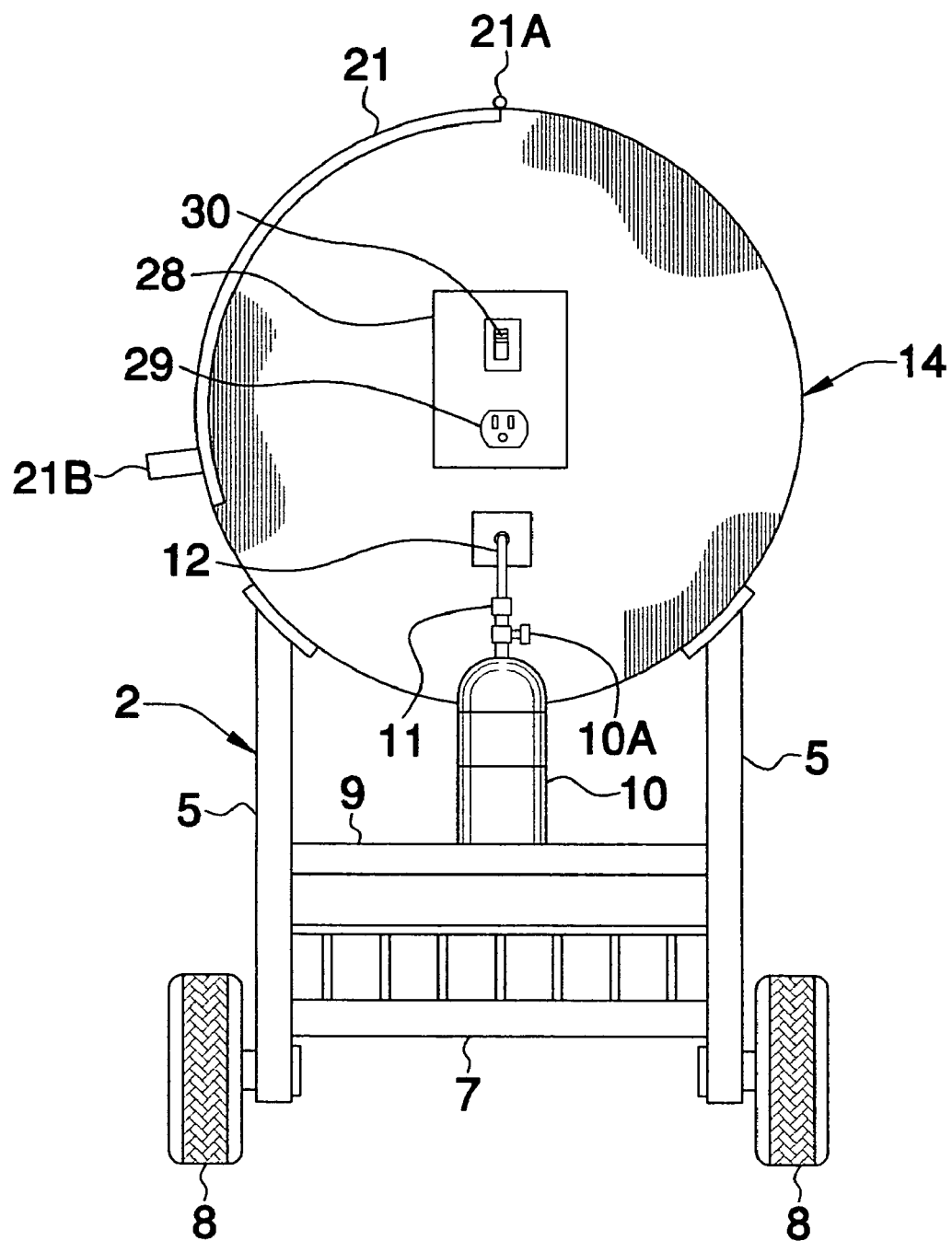
FIG. 3 is an end view of the multi-use cooker, illustrating a fuel tank connected to the cooking chamber element of the cooker for gas grilling applications and a control panel for the rotisserie rack.

Referring to the drawings, an illustrative embodiment of the multi-use cooker according to the present invention is generally indicated by reference numeral 1. The multi-use cooker 1 includes a support frame 2 which supports a cooking chamber 14. The support frame 2 is typically portable and includes a pair of spaced-apart stand members 3 (FIG. 6) and a pair of spaced-apart wheel mount members 5 (FIGS. 3 and 5). The lower end of each of the stand members 3 may be fitted with a foot 4. Wheels 8 are rotatably mounted on the lower ends of the respective wheel mount members 5. A pair of longitudinal connecting members 6 (one of which is shown in FIGS. 1 and 2) connects the stand members 3 to the respective wheel mount members 5. As shown in FIG. 3, a transverse connecting member 7 connects the wheel mount members 5 to each other and the stand members 3 to each other. A fuel tank support platform 9 extends from the wheel mount members 5 of the support frame 2, as shown in FIGS. 1 and 2, for supporting a fuel tank 10, the purpose of which will be hereinafter described.

The cooking chamber 14 is mounted typically on the upper ends of the stand members 3 and the wheel mount members 5 of the support frame 2. A handle 20 may be provided on one end of the cooking chamber 14 to facilitate transport of the multi-use cooker 1 on the wheels 8. The cooking chamber 14 may have a generally elongated, cylindrical shape and, as shown in FIGS. 5 and 6, includes a chamber wall 15 which defines a chamber interior 16. As shown in FIG. 2, a chamber opening 15a is provided in the chamber wall 15. A lid 21 is pivotally mounted on the chamber wall 15, via hinges 21a, and is fitted with a handle 21b. The lid 21 is pivotal between a closed position shown in FIG. 1 to cover the chamber opening 15a and an open position shown in FIG. 2 to expose the chamber opening 15a and provide access to the chamber interior 16. As shown in FIGS. 5 and 6, the lid 21 may have a generally arcuate configuration which completes the cylindrical shape of the cooking chamber 14 when in the closed position. At least one vent (not shown), which may be closeable, is typically provided in the chamber wall 15 and/or the lid 21 to vent the chamber interior 16 during use of the multi-use cooker 1.

Figure 4:
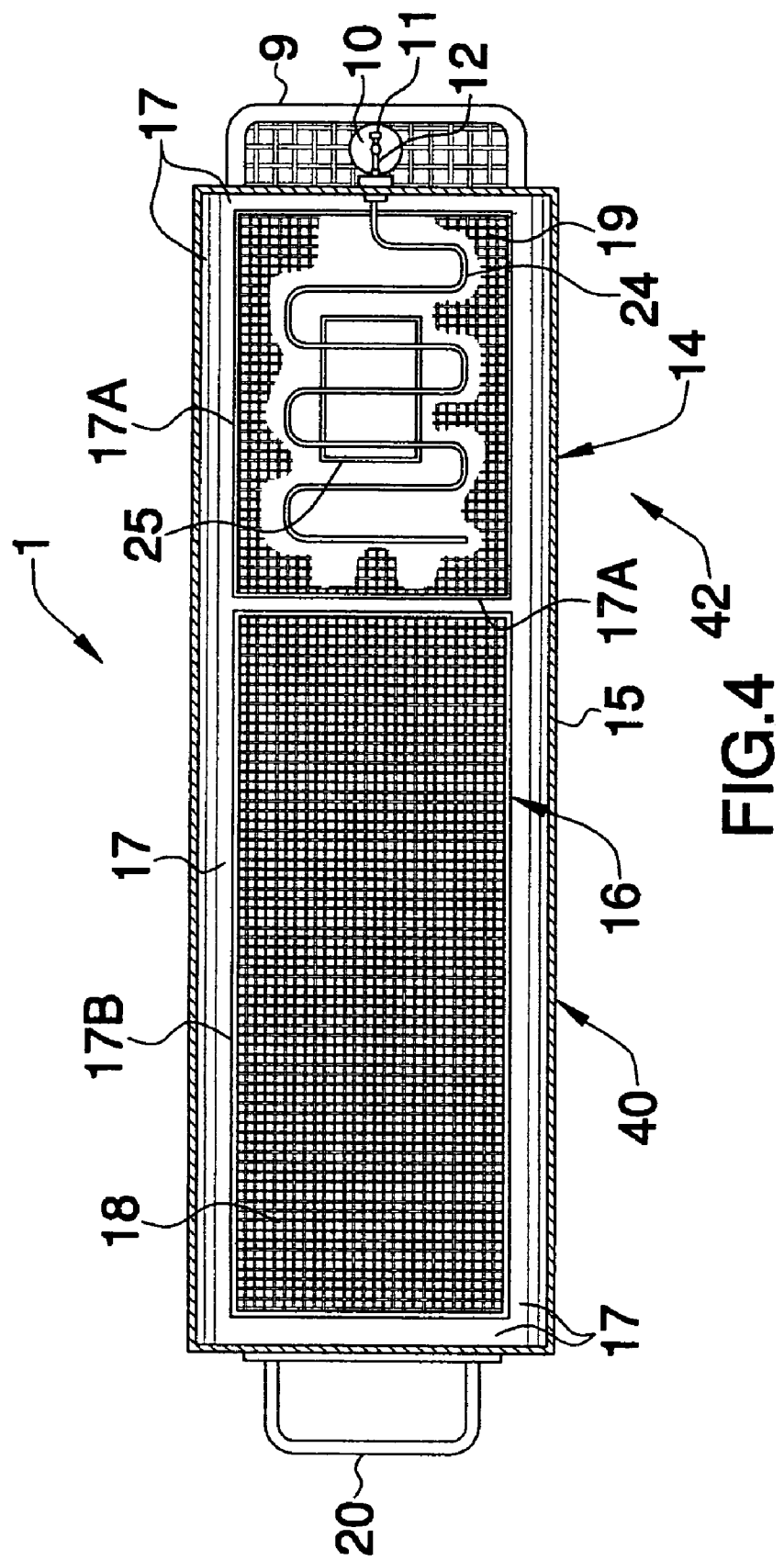
FIG. 4 is a sectional view, taken along section lines 4-4 in FIG. 2, of the multi-use cooker.

As shown in FIG. 4, the chamber interior 16 typically includes a charcoal/wood grilling section 40 and a gas grilling section 42 adjacent to each other. A grill support rack 17 extends along the perimeter of the chamber wall 15, inside the chamber interior 16. A dividing segment 17a may span the grill support rack 17 and separate the charcoal/wood grilling section 40 and the gas grilling section 42 from each other. A rack flange 17b extends upwardly from the grill support rack 17 and the dividing segment 17a. As shown in FIG. 6, in the charcoal/wood grilling section 40 of the chamber interior 16, a wood/charcoal grill panel 18 is removably fitted in the space defined by the rack flange 17b of the grill support rack 17. As shown in FIG. 5, in the gas grilling section 42 of the chamber interior 16, a gas grill panel 19 is removably fitted in the space defined by the rack flange 17b of the grill support rack 17. Thus, the wood/charcoal grill panel 18 and the gas grill panel 19 separate the main portion of the chamber interior 16 from a bottom portion 16a of the chamber interior 16.

As shown in FIGS. 4 and 5, at the gas grilling section 42, a burner coil 24, having multiple burner openings (not shown), is provided in the lower portion 16a of the chamber interior 16. As shown in FIG. 5, the burner coil 24 may be supported on a burner rack 27 which is mounted typically on the interior surface of the chamber wall 15. The burning coil 24 may have a generally winding configuration, as shown in FIG. 4. A fuel inlet conduit 12 is connected to the burning coil 24 and extends through the chamber wall 15 of the cooking chamber 14, above the fuel tank support platform 9. A coupling 11 is provided on the burning coil 24. Accordingly, as shown in FIGS. 1-4, when the fuel tank 10 is supported on the fuel tank support platform 9, a valve 10a of the fuel tank 10 is connected to the fuel inlet conduit 12. Therefore, fuel gas (not shown) is distributed from the fuel tank 11, through the fuel inlet conduit 12 and into the burner coil 24, where the gas burns and forms flames at the burner openings (not shown).

As further shown in FIG. 5, a liquid container 25 may be provided in the bottom portion 16a of the chamber interior 16, typically above the burner coil 24. The liquid container 25 may be supported by a container rack 26 which is mounted typically on the interior surface of the chamber wall 15. The liquid container 25 is adapted to hold water (not shown) during smoking of meats or other foods (not shown) in the chamber interior 16, as will be hereinafter further described.

As shown in FIGS. 2 and 5, a rotisserie rack 33 may be provided in the gas gilling section 42 of the chamber interior 16. As shown in FIG. 2, the rotisserie rack 33 may include a rod support 34 which extends downwardly from the upper portion of the cooking chamber 14. A rotisserie rod 35 is rotatably engaged by the rod support 34. Adjustable rotisserie prongs 36 are mounted on the rotisserie rod 35. A rotisserie motor 31 is provided on the exterior surface of the chamber wall 15 of the cooking chamber 14 and engages the rotisserie rod 35 for rotation. A control panel 28 is provided on the rotisserie motor 31 or elsewhere on the cooking chamber 14 or on the support frame 2. As shown in FIG. 3, the control panel 28 typically includes a power cord receptacle 29 which is electrically connected to the rotisserie motor 31 and is adapted for connection to a plug (not shown) on a power cord (not shown) plugged into an electrical outlet (not shown). A control switch 30, which facilitates selective operation of the rotisserie motor 31, is provided on the control panel 28. Accordingly, by manipulation of the control switch 30 to the "on" position, the rotisserie motor 31 rotates the rotisserie rod 35 and the rotisserie prongs 36 in the chamber interior 16. It is to be understood that the rotisserie motor 31 may be powered by a battery (not shown) in addition to or instead of being powered through an electrical outlet.

In use, the multi-use cooker is capable of facilitating individual or simultaneous grilling, smoking, roasting and/or barbecuing of foods such as meats and/or vegetables. For example, foods can be charcoal-grilled, wood-grilled or smoked on the wood/charcoal grill panel 18 by placing charcoal or wood in the bottom portion 16a of the chamber interior 16 at the charcoal/wood grilling section 40 and igniting the charcoal or wood. Smoking of the food can be accomplished by placement of the container 25 on the container rack 26 (FIG. 5), placement of water (not shown) in the container 25 and closing of the vents (not shown) in the lid 21. Foods can be grilled on the gas grill panel 19 of the gas grilling section 42 while operating the burner coil 24 as fuel gas is introduced into the burner coil 24 from the fuel tank 10. Meat can be grilled on the rotisserie rack 33 during operation of the burner coil 24 after causing engagement of the meat between the rotisserie prongs 36 through adjustment of the rotisserie prongs 36 on the rotisserie rod 35. Operation of the rotisserie motor 31 via manipulation of the control switch 30 causes rotation of the rotisserie rod 35, rotisserie prongs 36 and meat (not shown) between the rotisserie prongs 36 as the meat is uniformly roasted over the burner coil 24. It will be appreciated by those skilled in the art that the various grilling, smoking, roasting and/or barbecuing of the foods can be carried out individually or simultaneously due separation of the chamber interior 16 into the charcoal/wood grilling section 40 and the gas grilling section 42.

While the preferred embodiments of the invention have been described above, it will be recognized and understood that various modifications can be made in the invention and the appended claims are intended to cover all such modifications which may fall within the spirit and scope of the invention.

What is claimed is:

1. A multi-use cooker comprising:
a cooking chamber having a cooking chamber interior;
a charcoal/wood grilling section and a gas grilling section provided in said cooking chamber interior;
a burner coil provided in said gas grilling section;
a rotisserie rack provided in said gas grilling section; and
a support frame and wherein said cooking chamber is carried by said support frame;
said support frame comprises a pair of spaced-apart stand members; a pair of a pair of spaced-apart wheel mount members; a pair of longitudinal connecting members connecting said pair of stand members and said pair of wheel mount members, respectively; a pair of transverse connecting members connecting said pair of stand members to each other and said pair of wheel mount members to each other; and a pair of wheels carried by said pair of wheel mount members, respectively.

2. The multi-use cooker of claim 1 further comprising at least one wheel carried by said support frame.

3. The multi-use cooker of claim 1 further comprising a liquid container provided in said gas grilling section.

4. The multi-use cooker of claim 3 further comprising a container rack provided in said gas grilling section and wherein said liquid container is removably carried by said container rack.

5. The multi-use cooker of claim 1 further comprising a burner rack provided in said gas grilling section and wherein said burner coil is carried by said burner rack.

6. A multi-use cooker comprising:
a cooking chamber having a cooking chamber interior;
a grill support rack provided in said cooking chamber interior;
a charcoal/wood grilling section and a gas grilling section provided in said cooking chamber interior;
a charcoal/wood grill panel provided on said grill support rack in said charcoal/wood grilling section;
a gas grill panel provided on said grill support rack in said gas grilling section;
a burner coil provided in said gas grilling section, beneath said gas grill panel;
a rotisserie rack provided in said gas grilling section, above said gas grill panel; and
a support frame and wherein said cooking chamber is carried by said support frame;
said support frame comprises a pair of spaced-apart stand members; a pair of spaced-apart wheel mount members; a pair of longitudinal connecting members connecting said pair of stand members and said pair of wheel mount members, respectively; a pair of transverse connecting members connecting said pair of stand members to each other and said pair of wheel mount members to each other; and a pair of wheels carried by said pair of wheel mount members, respectively.

7. The multi-use cooker of claim 6 further comprising a dividing segment carried by said grill support rack and separating said charcoal/wood grilling section from said gas grilling section.

8. The multi-use cooker of claim 7 further comprising a rack flange carried by said grill support rack and said dividing segment.

9. The multi-use cooker of claim 6 further comprising a removable liquid container provided in said gas grilling section.

10. The multi-use cooker of claim 9 further comprising a container rack provided in said gas grilling section and wherein said liquid container is carried by said container rack.

11. The multi-use cooker of claim 6 further comprising a burner rack carried by said cooking chamber in said gas grilling section and wherein said burner coil is carried by said burner rack.

12. The multi-use cooker of claim 6 further comprising at least one wheel carried by said support frame. a

* * * * *